Aug. 1, 1950     C. A. AMSPAUGH     2,517,458

FISH LURE

Filed March 2, 1949     2 Sheets-Sheet 1

*INVENTOR.*
CLARENCE A. AMSPAUGH

BY
*West & Oldham*
ATTORNEYS

Aug. 1, 1950   C. A. AMSPAUGH   2,517,458
FISH LURE

Filed March 2, 1949   2 Sheets-Sheet 2

*INVENTOR.*
CLARENCE A. AMSPAUGH
BY
ATTORNEYS

Patented Aug. 1, 1950

2,517,458

UNITED STATES PATENT OFFICE 2,517,458

FISH LURE

Clarence A. Amspaugh, Willoughby, Ohio

Application March 2, 1949, Serial No. 79,189

10 Claims. (Cl. 43—34)

This invention relates to fish lures or artificial bait in general, and particularly, to a weedless, safely transportable fish lure which is provided with expandable, spring type pointed arms thereon.

Heretofore there have been a great variety of fish lures proposed and numerous types of artificial fish bait or lures have been available for use. Several different types of fish lures have heretofore been provided with a plurality of resilient arms which are normally extended at an appreciable angle with relation to the longitudinal axis of the lure. Such arms are adapted to be pressed in along the axis of the fish lure and be releasably secured in such position but to be detached therefrom when a fish strikes at or hits the fish lure. However, such fish lures, insofar as I am aware, have not been entirely satisfactory in that the spring arms in many instances would be difficult to disengage from the locking means provided therefor so that a fish could strike the lure and not release the spring arms so that the fish would not be hooked. Also, many of such lures have not been very easy or safe to carry in that the spring arms would frequently and easily snap outwardly of the fish lure upon the slightest jar or vibration when being carried around whereby the fisherman might be injured, or the bait might tangle itself up with other fish lures or baits being carried around by the fisherman in his tackle box or other member where the lures are being stored when not in use.

Another objection which has arisen against some previous types of fish lures provided is that there is no separate member for attachment of bait to the fish lure, in case it is desired to use such additional means for attracting fish to the lure. Yet another difficulty with previous types of lures, in general, is that it is not easy to take a fish off the lure after you once have caught the fish and have pulled it in. Thus if the fisherman wishes to return the fish to the water the fish would still be rather severely injured due to having been caught upon the lure.

It is the general object of the present invention to avoid and overcome the foregoing and other difficulties with present types of artificial fish lures, and to provide a novel lure which is characterized by its positiveness of release of spring arms forming a part thereof and by the locking of such spring arms in inoperative position, when desired.

Another object of the invention is to provide a fish lure which can be manufactured from a minimum of relatively uncomplicated, easily formed parts which can be easily and inexpensively assembled to form an attractive fish lure having desirable properties.

A further object of the invention is to provide a fish lure with a pair of resilient fish engaging arms which can be locked into a readily releasable position in which the arms provide a relatively weedless fish lure.

Another object of the present invention is to provide a fish lure that is adapted to catch substantially all fish striking same, but which has spring arms that engage the fish and can easily be disengaged from the fish with a minimum of physical damage being inflicted upon the fish by engagement of the spring arms with the fish.

The foregoing and other objects and advantages of the invention will be made more apparent as the specification proceeds.

For a better understanding of the present invention, attention is directed to the accompanying drawings, wherein.

Figure 1:
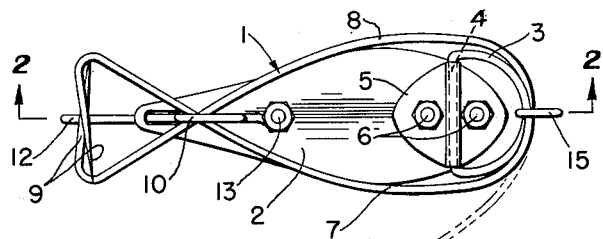
Fig. 1 is a bottom plan of a fish lure embodying the principles of the invention, with the spring arms of the fish lure being shown in their releasable operative position and with the extended position of one spring arm being indicated.
Figure 6:
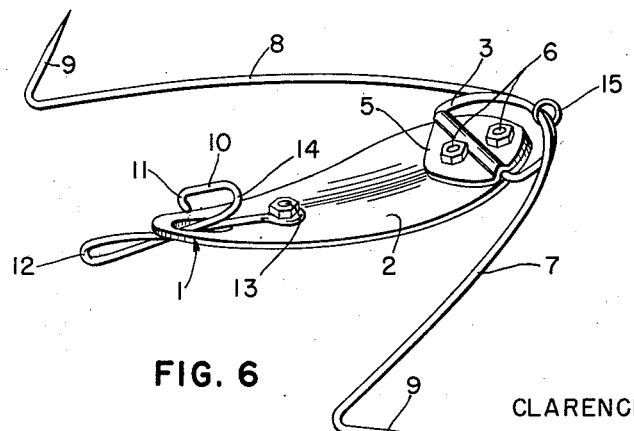
Fig. 6 is a perspective view of the fish lure of the invention with the spring arms thereof being in their released or extended position.

Attention now is directed to the details of the construction shown in the accompanying drawings, and a fish lure indicated generally by the numeral 1 is provided. This fish lure 1 comprises a body plate or body member 2 which may be formed from any conventional material and may be of any desired shape. However, in this instance, the body plate 2 is shown as being formed from a metal sheet, such as stainless steel, with the plate being of arcuate section in both a transverse and a longitudinal direction. A resilient wire is associated with the body plate 2 and a loop 3 is formed in such resilient wire, usually at the central portion thereof with such loop 3 being pivotally secured to the body plate 2 adjacent the front end thereof and on the lower surface of same. The loop 3 preferably has a substantially straight rear portion 4 which is engaged with a securing plate 5 that in turn is suitably secured to the body plate 2, as by means of bolts 6. Thus the plate 5 pivotally secures the loop 3 and the resilient wire to the body plate 2 of the fish lure. The loop 3 is of a relatively small diameter with relation to the length of wire of which it forms a part so that a pair of rearwardly and outwardly extending arms or legs 7 and 8 are also formed by the resilient wire. This wire may be of any desired construction, and usually is of a resilient stainless steel composition. These legs 7 and 8 normally take the position shown in Fig. 6 of the drawings and it will be seen that the legs 7 and 8 are of greater axial length than the body plate 2. At the rear end of each of the legs 7 and 8, an outwardly directed barb or point 9 is provided on each of the legs. Fig. 1 of the drawing best shows that the legs 7 and 8 are curved axially outwardly of the plate at their forward ends and curved axially inwardly of the plate 2 at their rear ends whereby the legs can be sprung inwardly of the fish lure into an overlapping position, as indicated in the drawings.

Figure 2:
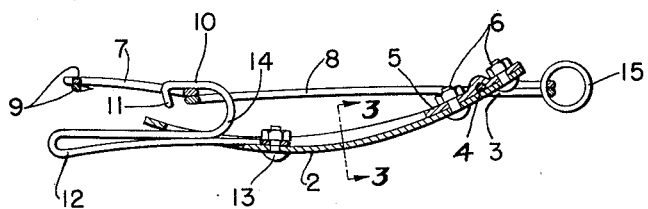
Fig. 2 is a longitudinal section taken on line 2—2 of Fig. 1.
Figure 3:
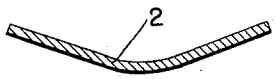
Fig. 3 is a fragmentary, transverse vertical section taken on line 3—3 of Fig. 2.
Figure 4:
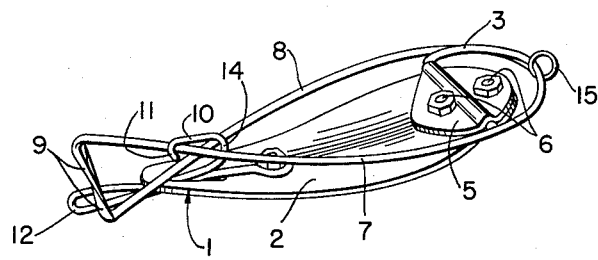
Fig. 4 is a perspective view of the fish lure of Fig. 1 with the spring arms thereof being in their releasable, operative position.

As an important feature of the present invention, a trigger and lock member, or wire is provided on the rear portion of the body plate 2. In this instance, this member comprises a lock wire 10 a portion of which extends upwardly and outwardly with relation to the body plate 2 and terminates in an inwardly directed hook end 11 which is spaced from the body plate 2 and is positioned rearwardly of the fish lure 1 with relation to the portion of the lock wire 10 which extends from the hook 11 down into association with the body plate 2. Fig. 4 particularly shows that the legs 7 and 8 can be both engaged with the hook 11. This action is achieved by individually springing the legs 7 and 8 axially inwardly of the fish lure 1 until they substantially abut against the lock wire 10 and can be moved outwardly of the body plate 2 into association with the hook 11. At such time, the inherent natural resiliency of the wire forming the legs 7 and 8 retains them in their given position until some external force, such as a fish striking the lure 1 forces the leg 7 or 8 toward the body plate 2 and such movement of same will disengage the leg from the hook 11. Fig. 2 shows that the hook 11 may be inclined slightly toward the front portion of the body plate 2 to aid in retaining the leg in engagement with same.

As another feature of the present invention, a bait engaging loop 12 is also provided in association with the fish lure 1. In this instance, the loop 12 is formed integrally with the lock wire 10 and it extends axially rearwardly from the body plate 2 on the surface thereof opposed to that with which the hook 11 is associated. In this instance, the end of the lock wire 10 is secured around a bolt 13 which secures same to the body plate 2 although this wire could easily be soldered, welded or otherwise engaged with the body plate.

Figure 5:
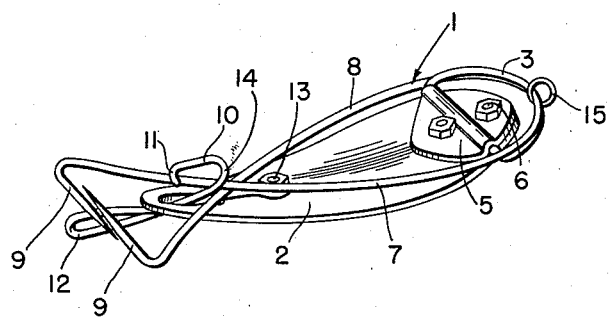
Fig. 5 is a similar perspective view of the fish lure showing the spring arms thereof being in their locked, inoperative position.

Fig. 5 illustrates the carrying or safety position of the legs 7 and 8. In this instance, the legs are individually sprung completely over the lock wire 10 to be on the opposite side of same adjacent the barbed or pointed ends of the legs 7 and 8 as is the front portion of the leg adjacent the loop 3. To this end, the lock wire 10 is provided with a base section 14 which extends more or less upwardly and forwardly of the body plate 2 in the form of a gradual curve to provide a base portion for the lock wire under which the legs 7 and 8 can be sprung to retain them in substantially fixed position until the legs are individually compressed axially inwardly further of the fish lure and then moved in a direction substantially normal to the body plate 2 out of engagement with the lock wire 10. Hence a safe carrying or storage position is provided for the legs 7 and 8 and accidental outward springing of same is avoided.

It will be realized that the body plate 2 can be in any angular position with relation to the legs 7 and 8 which, together with the loop 3 usually define a plane. Fig. 2 of the drawings clearly shows that the rear portion of the body plate 2 normally is spaced appreciably from the ends 9 of the legs 7 and 8 whereby the legs 7 and 8 are free for limited movement toward the body plate 2 so as to be engaged with or disengaged from the hook 11.

It will be seen in both Figs. 4 and 5 that the barbs 9 on the legs 7 and 8 are positioned in substantially superimposed and overlapped relation whereby the barbs cannot catch on any article when in such position. However, the automatic outward snapping or springing of same when they are released will provide an effective fish catching action for the fish lure 1. By use of any additional bait desired in the bait loop 12, even more desirable results can be achieved. However, the fish lure 1 will operate effectively without the use of any additional bait means in conjunction therewith. If desired, the fish lure 1 may be painted any desired color or may be otherwise produced and have additional attachments associated therewith to facilitate the catching of fish thereby.

Usually a leader ring 15 is engaged with the front portion of the loop 3 to facilitate securing a fish line thereto.

In the accompanying specification, the terms "front" and "rear" are spoken of with relation to the normal positioning of the fish lure 1 whereby the loop 3 will be at the front end of same for movement of the lure 1 through the water.

In some instances, it may be desired to make the bait receiving loop 12 more in the shape of a releasable pin, resembling a safety pin construction whereby the member 12 would be separated into two pieces, both of which would be separately secured, as by brazing or soldering, to the body plate 2. One portion of the member 12 would be adapted to be depressed with relation to the other in order to hook onto one of the bait receiving members a desired article, such as pork rind.

While one complete embodiment of the invention has been disclosed herein, it will be appreciated that modification of this particular embodiment of the invention may be resorted to without departing from the scope of the invention as defined by the appended claims.

Having thus described my invention, what I claim is:

1. A fish lure comprising a body plate, a resilient wire having a small loop formed therein at the center thereof and having a pair of rearwardly and outwardly extending legs formed thereon terminating in outwardly directed barbs, means pivotally securing the loop of said wire to said plate and a lock wire extending outwardly and rearwardly of said body plate adjacent the rear portion thereof and terminating in an inwardly directed hook end spaced from said plate, a second portion of said lock wire engaging said legs to limit laterally inward movement of same, said rearwardly and outwardly extending legs being adapted to be moved into a position extending substantially along the longitudinal axis of said plate but crossing over said axis and having the barbs thereof extending back towards said axis and engage with said hook end of said lock wire but be released therefrom for automatic outward spring movement by movement towards said body plate.

2. A lure as in claim 1 wherein the said barbs on said legs are positioned axially beyond the end of said body plate, and a bait receiving member is secured to said body plate and extends rearwardly therefrom.

3. A fish lure comprising a body plate, a resilient wire having a loop formed therein at the center thereof and having a pair of rearwardly and outwardly extending legs formed thereon terminating in outwardly directed barbs, means pivotally securing the rear portion of the loop of said wire to said body plate, a leader ring carried by said looped portion of said wire, and a trigger and lock wire secured to said plate adjacent the rear thereof and extending therefrom, said legs of said loop being capable of resiliently engaging with said trigger and lock wire in a readily disengageable manner.

4. A fish lure comprising a body plate, a resilient wire having a loop formed therein at substantially the center thereof and having a pair of rearwardly and outwardly extending elongate legs formed thereon, one at each side thereof and terminating in outwardly directed barbs, means pivotally securing the rear portion of the loop of said wire to said plate, a trigger and lock wire secured to said plate adjacent the rear thereof and having a hook portion, said legs of said loop being on one side of said plate extending beyond the rear end of said plate and being engageable with said hook portion of said trigger and lock wire in a readily disengageable manner, and a bait positioning loop member carried by said body plate and extending rearwardly therefrom to a point adjacent the barbed ends of said legs.

5. A fish lure comprising a body plate lying substantially in a plane, a lock wire extending outwardly and rearwardly of said body plate adjacent the rear portion thereof and terminating in an inwardly directed hook end spaced from said plate, and a resilient wire pivotally engaged with said plate adjacent the front end thereof and having a pair of rearwardly and outwardly extending legs each of which may be moved into a position extending substantially along the longitudinal axis of said plate but crossing over said axis and engage with the inwardly directed end of said lock wire, said legs normally lying in a plane on one side of and spaced from said body plate and being releasable from engagement with said hook end by movement towards said body plate.

6. A fish lure comprising a body plate, a lock wire extending outwardly and rearwardly of said body plate adjacent the rear portion thereof and terminating in an inwardly directed end spaced from said plate, a resilient wire pivotally engaged with said plate adjacent the front end thereof and having a pair of rearwardly and outwardly extending legs each of which may be moved into a position extending substantially along the longitudinal axis of said plate but crossing over said axis and engage with the inwardly directed end of said lock wire, said resilient wire having a loop with a substantially straight rear portion formed in its front end, and securing means engaged with said body plate and overlying said rear portion of the loop in said resilient wire to hinge said plate to said resilient wire for movement in a plane substantially normal to a plane defined by said resilient wire.

7. A lure as in claim 6 wherein the said outwardly extending portion of said lock wire is curved upwardly and has a portion extending forwardly with relation to said plate, and each of said legs can be moved completely over said lock wire to be fixedly locked under the forward end of same to be retained in such given position until forced outwardly of said plate in a direction substantially normal thereto.

8. A fish lure comprising a body member, a lock member having a portion extending outwardly and rearwardly of said body member adjacent the rear portion thereof and terminating in an inwardly directed hook portion spaced from said body member, and a resilient wire pivotally engaged with said body member adjacent the front end thereof and having a pair of rearwardly and outwardly extending legs each of which may be moved into a position extending substantially along the longitudinal axis of said body member and releasably engage with the hook of said lock member but crossing over said axis.

9. A lure as in claim 8 wherein the said outwardly extending portion of said lock member has a forward base portion that is curved upwardly and has a portion extending forwardly with relation to said body member, and said legs can be individually moved completely over said lock member to be locked under the base portion of same.

10. A fish lure comprising a body plate, a resilient wire having a loop formed therein at the center thereof and having a pair of relatively long rearwardly and outwardly extending legs formed thereon terminating in outwardly directed barbs, means pivotally securing the loop of said wire to said plate, a bait engaging member extending longitudinally from the rear portion of said plate, and a trigger and lock wire secured to said plate adjacent the rear thereof and extending therefrom substantially normally thereto, said legs of said loop being capable of resiliently engaging with said trigger and lock wire on one side of said plate and be disengaged from same by movement towards said body plate, said barbs being opposed and shielding each other when said legs engage said trigger and lock wire.

CLARENCE A. AMSPAUGH.

REFERENCES CITED

The following references are of record in the file of this patent:

UNITED STATES PATENTS

| Number | Name | Date |
|---|---|---|
| 1,388,058 | Peterson | Aug. 16, 1921 |
| 1,649,140 | Steffens | Nov. 15, 1927 |